US010519526B2

(12) United States Patent
Lee et al.

(10) Patent No.: US 10,519,526 B2
(45) Date of Patent: Dec. 31, 2019

(54) HIGH-STRENGTH COLD ROLLED STEEL SHEET HAVING EXCELLENT DUCTILITY, HOT-DIP GALVANIZED STEEL SHEET AND METHOD FOR MANUFACTURING SAME

(71) Applicant: POSCO, Pohang-si, Gyeongsangbuk-do (KR)

(72) Inventors: Kyoo-Young Lee, Gwangyang-si (KR); Jai-Hyun Kwak, Gwangyang-si (KR); Joo-Hyun Ryu, Gwangyang-si (KR); Dong-Seoug Sin, Gwangyang-si (KR); Se-Don Choo, Gwangyang-si (KR)

(73) Assignee: POSCO, Pohang-si, Gyeongsangbuk-do (KR)

(*) Notice: Subject to any disclaimer, the term of this patent is extended or adjusted under 35 U.S.C. 154(b) by 275 days.

(21) Appl. No.: 15/308,074

(22) PCT Filed: Jan. 9, 2015

(86) PCT No.: PCT/KR2015/000235
§ 371 (c)(1),
(2) Date: Oct. 31, 2016

(87) PCT Pub. No.: WO2015/174605
PCT Pub. Date: Nov. 19, 2015

(65) Prior Publication Data

US 2017/0051378 A1 Feb. 23, 2017

(30) Foreign Application Priority Data

May 13, 2014 (KR) ........................ 10-2014-0057177

(51) Int. Cl.
*C21D 9/46* (2006.01)
*C22C 38/06* (2006.01)
(Continued)

(52) U.S. Cl.
CPC .............. *C21D 9/46* (2013.01); *B32B 15/013* (2013.01); *C21D 1/20* (2013.01); *C21D 1/22* (2013.01);
(Continued)

(58) Field of Classification Search
CPC ... C21D 1/19; C21D 1/20; C21D 1/22; C21D 1/26; C21D 1/28; C21D 1/30; C21D 1/32;
(Continued)

(56) References Cited

U.S. PATENT DOCUMENTS 6,210,496 B1 4/2001 Takagi et al.
2006/0011274 A1 1/2006 Speer et al.
(Continued)

FOREIGN PATENT DOCUMENTS

CN 1692166 A 11/2005
EP 0922782 A1 6/1999
(Continued)

OTHER PUBLICATIONS

E. De Moor, et al., "Effect of Carbon and Manganese on the Quenching and Partitioning Response of CMnSi Steels," ISIJ International, vol. 51 (2011), No. 1, pp. 137-144.
(Continued)

*Primary Examiner* — Scott R Kastler
*Assistant Examiner* — Vanessa T. Luk
(74) *Attorney, Agent, or Firm* — Morgan, Lewis & Bockius LLP

(57) ABSTRACT

The present invention relates to: a high-strength steel sheet used for construction materials and transportation means such as vehicles and trains and, more specifically, to a high-strength cold rolled steel sheet having excellent ductility, a hot-dip galvanized steel sheet, and a method for manufacturing the same.

11 Claims, 3 Drawing Sheets

(51) Int. Cl.

| | |
|---|---|
| ***C21D 8/02*** | (2006.01) |
| ***C22C 38/02*** | (2006.01) |
| ***C21D 1/20*** | (2006.01) |
| ***C21D 1/22*** | (2006.01) |
| ***C22C 38/12*** | (2006.01) |
| ***C22C 38/44*** | (2006.01) |
| ***C23C 2/02*** | (2006.01) |
| ***C23C 2/06*** | (2006.01) |
| ***C23C 2/28*** | (2006.01) |
| ***C22C 38/04*** | (2006.01) |
| ***B32B 15/01*** | (2006.01) |
| ***C22C 38/00*** | (2006.01) |
| ***C22C 38/08*** | (2006.01) |
| ***C22C 38/14*** | (2006.01) |
| ***C23C 2/40*** | (2006.01) |

(52) U.S. Cl.
CPC ......... *C21D 8/0226* (2013.01); *C21D 8/0236* (2013.01); *C21D 8/0263* (2013.01); *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/44* (2013.01); *C23C 2/02* (2013.01); *C23C 2/06* (2013.01); *C23C 2/28* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
CPC ........ C21D 6/005; C21D 6/008; C21D 8/005; C21D 8/0205; C21D 8/0236; C21D 8/0273; C21D 8/0405; C21D 8/0436; C21D 8/0473; C21D 9/46; C21D 9/48; C21D 2211/005; C21D 2211/008
See application file for complete search history.

(56) References Cited

U.S. PATENT DOCUMENTS

| | | | |
|---|---|---|---|
| 2013/0133792 | A1 | 5/2013 | Nakagaito et al. |
| 2015/0034218 | A1 | 2/2015 | Krizan et al. |
| 2015/0167133 | A1 | 6/2015 | Paul et al. |
| 2016/0177414 | A1 | 6/2016 | Takashima et al. |

FOREIGN PATENT DOCUMENTS

| | | | | |
|---|---|---|---|---|
| EP | 1486574 | A1 | | 12/2004 |
| JP | H11-350038 | A | | 12/1999 |
| JP | 2005-133201 | A | | 5/2005 |
| JP | 2005-336526 | A | | 12/2005 |
| JP | 2010-065307 | A | | 3/2010 |
| JP | 2010-275627 | A | | 12/2010 |
| JP | 2011-140695 | A | | 7/2011 |
| JP | 2011140695 | A | * | 7/2011 |
| JP | 2012-188738 | A | | 10/2012 |
| JP | 2012-237044 | A | | 12/2012 |
| JP | 2015-034327 | A | | 2/2015 |
| KR | 1994-0002370 | A | | 2/1994 |
| KR | 10-2004-0091751 | A | | 10/2004 |
| KR | 10-2011-0119285 | A | | 11/2011 |
| KR | 10-2013-0027793 | A | | 3/2013 |
| KR | 10-2013-0027794 | A | | 3/2013 |
| KR | 10-2013-0046966 | A | | 5/2013 |
| KR | 10-2013-0143278 | A | | 12/2013 |
| WO | 2013/144376 | A1 | | 10/2013 |
| WO | 2013/144377 | A1 | | 10/2013 |

OTHER PUBLICATIONS

International Search Report dated Apr. 3, 2015 issued in International Patent Application No. PCT/KR2015/00235 (with English translation).
Chinese Office Action dated Feb. 5, 2018 issued in Chinese Patent Application No. 201580024699.8.
Japanese Office Action dated Jan. 9, 2018 issued in Japanese Patent Application No. 2016-567415 (with English translation).
Extended European Search Report dated Feb. 1, 2017 issued in European Patent Application No. 15792948.0.

* cited by examiner

【FIG. 1A】
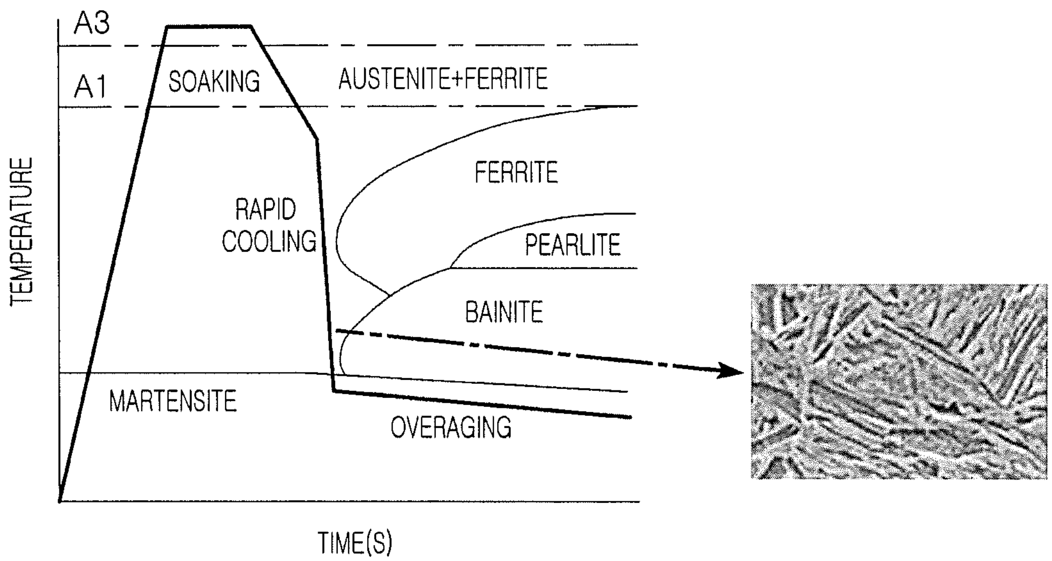
【FIG. 1B】
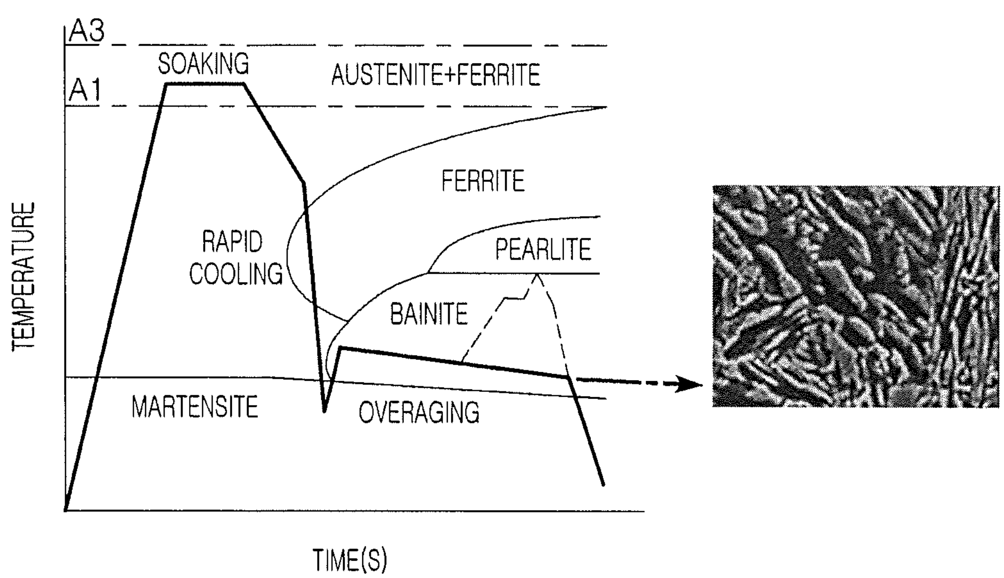

【FIG.2】
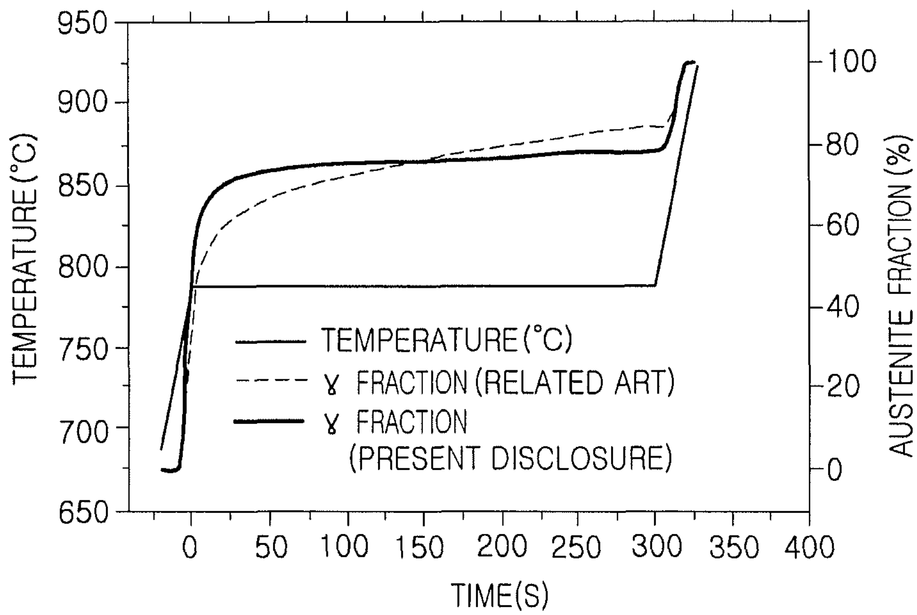
【FIG.3】
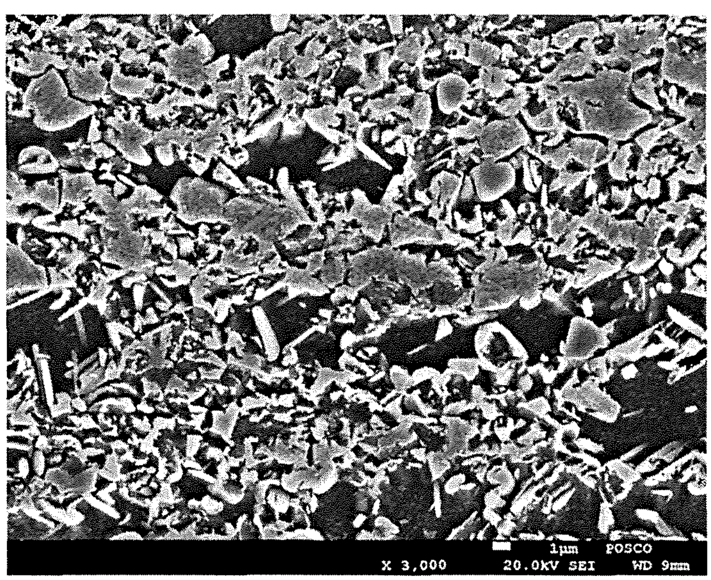

【FIG.4】
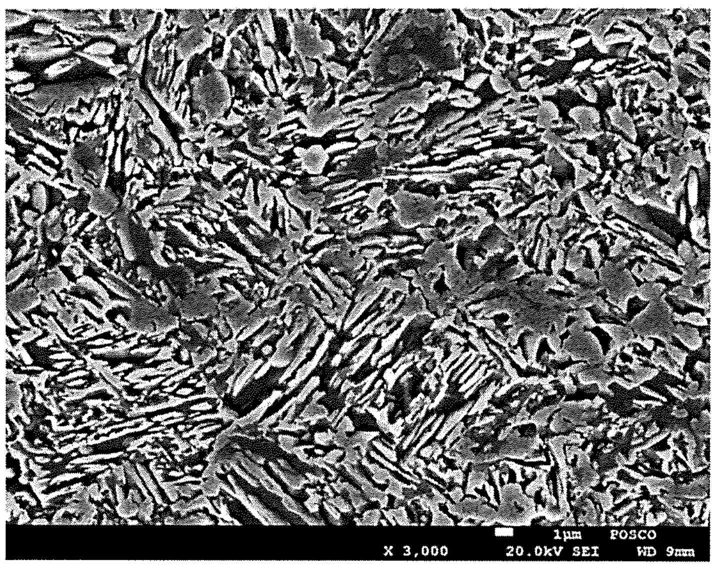

HIGH-STRENGTH COLD ROLLED STEEL SHEET HAVING EXCELLENT DUCTILITY, HOT-DIP GALVANIZED STEEL SHEET AND METHOD FOR MANUFACTURING SAME

RELATED APPLICATIONS

This application is the U.S. National Phase under 35 U.S.C. § 371 of International Application No. PCT/KR2015/0000235, filed on Jan. 9, 2015, which in turn claims the benefit of Korean Patent Application Nos. 10-2014-0057177, filed on May 13, 2014, the disclosure of which applications are incorporated by reference herein.

TECHNICAL FIELD

The present disclosure relates to a high-strength steel sheet used for construction materials and means of transportation, such as vehicles and trains and, more specifically, to a high-strength cold-rolled steel sheet having excellent ductility, a hot-dip galvanized steel sheet, and a method for manufacturing the same.

BACKGROUND ART

In order to make steel sheets lightweight, which are used for construction materials and structural members of means of transportation, such as vehicles and trains by reducing the thickness of the steel sheets, there have been many attempts to increase the strength of conventional steel. However, in the case of increasing the strength of the conventional steel, a disadvantage, wherein the ductility thereof has been relatively decreased, was found.

Hence, a lot of research on improvements in the relationship between strength and ductility has been conducted. As a result, advanced high strength steel (AHSS), using a retained austenite phase, as well as martensite and bainite, which are low temperature microstructures, has been developed and applied.

AHSS is classified into so-called dual phase (DP) steel, transformation induced plasticity (TRIP) steel, and complex phase (CP) steel. Each type of steel has different mechanical properties, that is, tensile strength and elongation percentage, according to a type and fraction of a mother phase and a second phase. In particular, TRIP steel, containing retained austenite, has the highest balance value (TS×El) of tensile strength and elongation percentage.

CP steel, among the above-mentioned types of AHSS, has an elongation percentage lower than other types of steel, and so has limited use in simple processing operations such as roll forming, while DP steel and TRIP steel, having high ductility, are applied to cold press forming or the like.

In addition to the above-mentioned types of AHSS, twinning induced plasticity (TWIP) steel (Patent Document 1), in which microstructures of steel formed of single phase austenite can be obtained by adding large amounts of carbon (C) and manganese (Mn) to the steel, is used. TWIP steel has a balance (TS×El) of tensile strength and elongation percentage of 50,000 MPa % or more, and exhibits very good material characteristics.

However, in order to manufacture such TWIP steel, the content of Mn is required to be about 25 wt % or more when the content of C is 0.4 wt %, and the content of Mn is required to be about 20 wt % or more when the content of C is 0.6 wt %. When these conditions are not satisfied, an austenite phase, causing a twinning phenomenon in a mother phase, cannot be stably secured, and epsilon martensite (ε), having an HCP structure, and martensite, having a BCT structure (α'), both of which greatly reduce processability, are formed. Thus, a large number of austenite stabilizing elements are required to be added so that austenite can be stably present at room temperature. As such, a process of casting or rolling TWIP steel having large amounts of alloy components added thereto may be difficult, due to problems caused by the alloy components, while, economically, manufacturing costs of TWIP steel may be increased.

Accordingly, so-called third-generation steel or extra advanced high strength steel (X-AHSS) having ductility higher than that of DP steel and TRIP steel, that is, AHSS, and lower than that of TWIP steel, and having low manufacturing costs, has been developed, but there has been no great achievement to the present.

As an example, a process of quenching and partitioning (Q&P) forming of retained austenite and martensite as main microstructures is disclosed in Patent Document 2, and according to a report based on using that process (Non-Patent Document 1), a disadvantage can be seen wherein, when the content of C is low (about 0.2%), yield strength is reduced to about 400 MPa, and only an elongation percentage of a final product similar to that of conventional TRIP steel can also be obtained.

Further, a method for significantly improving yield strength by increasing an amount of an alloy of C and Mn has also been introduced, but in this case, a problem that weldability is decreased due to alloy components being added in an excessive amount may occur.

Patent Document 1: Korean Patent Laid-Open Publication No. 1994-0002370

Patent Document 2: U.S. Patent Publication No. 20060011274

Non-Patent Document 1: ISIJ International, Vol. 51, 2011, pp. 137-144

DISCLOSURE

Technical Problem

An aspect of the present disclosure may provide a cold-rolled steel sheet capable of reducing alloy costs in comparison to conventional TWIP steel, and having more excellent ductility, a hot-dip galvanized steel sheet and a galvannealed steel sheet manufactured by using the cold-rolled steel sheet, and a method for manufacturing the same.

Technical Solution

According to an aspect of the present disclosure, a high-strength cold-rolled steel sheet having excellent ductility may include: by wt %, carbon (C): 0.1% to 0.3%, silicon (Si): 0.1% to 2.0%, aluminum (Al): 0.005% to 1.5%, manganese (Mn): 1.5% to 3.0%, phosphorus (P): 0.04% or less (excluding 0%), sulfur (S): 0.015% or less (excluding 0%), nitrogen (N): 0.02% or less (excluding 0%), and a remainder of iron (Fe) and inevitable impurities. A sum of Si and Al (Si+Al) (wt %) satisfies 1.0% or more. A microstructure may include, by area fraction, 5% or less of polygonal ferrite having a minor axis to major axis ratio of 0.4 or greater, 70% or less of acicular ferrite having a minor axis to major axis ratio of 0.4 or less, 25% or less (excluding 0%) of acicular retained austenite, and a remainder of martensite.

According to another aspect of the present disclosure, a hot-dip galvanized steel sheet formed by hot-dip galvanizing the cold-rolled steel sheet, and a galvannealed steel sheet formed by galvannealing treating the hot-dip galvanized steel sheet, may be provided.

According to another aspect of the present disclosure, a method for manufacturing a high-strength cold-rolled steel sheet having excellent ductility may include: reheating a steel slab satisfying the above-mentioned component composition at 1,000° C. to 1,300° C.; manufacturing a hot-rolled steel sheet by hot finishing rolling the reheated steel slab at 800° C. to 950° C.; coiling the hot-rolled steel sheet at 750° C. or less; manufacturing a cold-rolled steel sheet by cold rolling the coiled hot-rolled steel sheet; performing a first annealing operation of annealing and cooling the cold-rolled steel sheet at a temperature of Ac3 or more; and performing a second annealing operation of heating and maintaining the cold-rolled steel sheet at a temperature of Ac1 to Ac3 after the first annealing operation, cooling the cold-rolled steel sheet at a temperature of Ms to Mf at a cooling rate of 20° C./s or more, reheating the cold-rolled steel sheet at a temperature of Ms or more, maintaining the cold-rolled steel sheet for 1 second or more, and cooling the cold-rolled steel sheet.

According to another aspect of the present disclosure, a method for manufacturing a hot-dip galvanized steel sheet, further including a galvanizing operation, in addition to the above-mentioned manufacturing method, and a method for manufacturing a galvannealed steel sheet, further including a galvannealing operation, in addition to the method for manufacturing a hot-dip galvanized steel sheet, may be provided.

Advantageous Effects

According to the present disclosure, as compared to a high-ductility advanced high strength steel (AHSS), such as a conventional DP steel or TRIP steel, and to a quenching & partitioning (Q&P) steel thermally treated in a Q&P manner, a high-strength cold-rolled steel sheet having excellent ductility and a good tensile strength of 780 MPa or more, a hot-dip galvanized steel sheet, and an alloyed hot-dip galvanized steel sheet, may be provided.

Further, the cold-rolled steel sheet according to the present invention may have the advantage of being highly likely to be used in industries such as construction materials and automotive steel sheets.

DESCRIPTION OF DRAWINGS

FIGS. 1A and 1B are examples of an annealing process according to the present disclosure, in which the dotted line of FIG. 1B indicates a heat history at a time of hot-dip alloy plating a steel sheet;

FIG. 2 illustrates differences among austenite transformation rates for a time duration at an annealing temperature, according to microstructures before final annealing;

FIG. 3 is a photo of microstructures of a cold-rolled steel sheet (Comparative Example 6) manufactured by a conventional Q&P heat treatment; and FIG. 4 is a photo of microstructures of a cold-rolled steel sheet (Inventive Example 12) manufactured according to the present disclosure.

BEST MODE FOR INVENTION

After studying in depth a method for improving low ductility of a high-ductility, high-strength steel manufactured through a conventional quenching & partitioning (Q&P) heat treatment, the present inventors confirmed that microstructures may be refined and physical properties of a final product may be improved after a final Q&P heat treatment by controlling initial microstructures before a Q&P heat treatment, and perfected the present disclosure.

The present disclosure will hereinafter be described in detail.

According to an aspect of the present disclosure, a high-strength cold-rolled steel sheet having excellent ductility may include: by wt %, carbon (C): 0.1% to 0.3%, silicon (Si): 0.1% to 2.0%, aluminum (Al): 0.005% to 1.5%, manganese (Mn): 1.5% to 3.0%, phosphorus (P): 0.04% or less (excluding 0%), sulfur (S): 0.015% or less (excluding 0%), nitrogen (N): 0.02% or less (excluding 0%), and a remainder of iron (Fe) and inevitable impurities, and the sum of Si and Al (Si+Al) (wt %) may preferably satisfy 1.0% or more.

Hereinafter, the reason why an alloy component composition of a cold-rolled steel sheet provided in the present disclosure is limited, as described above, will be described in detail. At this time, contents of the respective components refer to weight %, unless otherwise mentioned.

C: 0.1% to 0.3%

Carbon (C) is an element effective in reinforcing a steel, and is an important element added to stabilize retained austenite and to secure strength in the present disclosure. In order to obtain the above-mentioned effect, adding 0.1% or more of C may be preferable, but when the content thereof exceeds 0.3%, the risk of incurring slab defects is increased and weldability is significantly reduced. Thus, the content of C may preferably be limited to 0.1% to 0.3% in the present disclosure.

Si: 0.1% to 2.0%

Silicon (Si) is an element suppressing the precipitation of a carbide within ferrite, and encouraging carbon contained in the ferrite to diffuse into austenite, thus contributing to stabilization of the retained austenite. In order to obtain the above-mentioned effect, adding 0.1% or more of Si may be preferable, but when the content thereof exceeds 2.0%, hot and cold rolling properties are significantly degraded and plating properties are reduced, since an oxide is formed on the surface of a steel. Thus, the content of Si may preferably be limited to 0.1% to 2.0% in the present disclosure.

Al: 0.005% to 1.5%

Aluminum (Al) is an element combined with oxygen contained in a steel to deoxidize the steel, and for this, the content of Al may preferably be maintained to be 0.005% or more. Also, Al contributes to the stabilization of the retained austenite through suppressing generation of a carbide within the ferrite, as in Si. When the content of such Al exceeds 1.5%, manufacturing a normal slab using a reaction in Mold Plus at a time of casting may be difficult, and plating properties may also be reduced, since a surface oxide is formed. Thus, the content of Al may preferably be limited to 0.005% to 1.5% in the present disclosure.

As mentioned above, Si and Al are the elements contributing to the stabilization of the retained austenite. In order to effectively achieve this effect, the sum of Si and Al (Si+Al) (wt %) may preferably satisfy 1.0% or more.

Mn: 1.5% to 3.0%

Manganese (Mn) is an element effective in forming and stabilizing the retained austenite while controlling transformation of the ferrite. When the content of such Mn is less than 1.5%, a large amount of the ferrite transforms, which causes a problem where securing target strength may be difficult. On the other hand, when the content of Mn exceeds 3.0%, phase transformation in a second annealing operation of the present disclosure may be delayed too long, and may cause a large amount of martensite to be formed, making it difficult to secure the intended ductility. Thus, the content of Mn may preferably be limited to 1.5% to 3.0% in the present disclosure.

P: 0.04% or Less (Excluding 0%)

Phosphorus (P) is an element capable of obtaining a solid solution strengthening effect, but when the content thereof exceeds 0.04%, weldability is degraded and the risk of incurring brittleness of a steel is increased. Thus, the content of P may preferably be limited to 0.04% or less, and more preferably, to 0.02% or less, in the present disclosure.

S: 0.015% or Less (Excluding 0%)

Sulfur (S) is an impurity element inevitably contained in a steel, and the content of S may preferably be limited to the maximum. In theory, limiting the content of S to 0% is advantageous, but since S is inevitably required to be contained in the steel in a manufacturing process thereof, managing an upper limit of the content of S is important. When the content of S exceeds 0.015%, ductility and weldability of a steel sheet may be highly likely to deteriorate. Thus, the content of S may preferably be limited to 0.015% or less in the present disclosure.

N: 0.02% or Less (Excluding 0%)

Nitrogen (N) is an element effective in stabilizing the austenite, but when the content of N exceeds 0.02%, the risk of incurring brittleness of the steel is increased, and the quality of continuous casting is reduced as an excessive amount of AlN is precipitated through a reaction between N and Al. Thus, the content of N may preferably be limited to 0.02% or less in the present disclosure.

The cold-rolled steel sheet according to the present disclosure may further include at least one of titanium (Ti), niobium (Nb), vanadium (V), zirconium (Zr), and tungsten (W), in order to improve strength or the like, in addition to the above-mentioned components.

At least one of Ti: 0.005% to 0.1%, Nb: 0.005% to 0.1%, V: 0.005% to 0.1%, Zr: 0.005% to 0.1%, and W: 0.005% to 0.5%.

Titanium (Ti), niobium (Nb), vanadium (V), zirconium (Zr), and tungsten (W) are elements effective in precipitation hardening of the steel sheet and refining of crystal grains. When each of the contents thereof is less than 0.005%, securing the above-mentioned effects becomes difficult. Whereas when the contents of Ti, Nb, V, and Zr exceed 0.1% and the content of W exceeds 0.5%, the above-mentioned effects are exacerbated, manufacturing costs are greatly increased, and ductility is significantly reduced, since an excessive amount of precipitation is formed.

Further, the cold-rolled steel sheet according to the present disclosure may also include at least one of Mo, Ni, Cu, and Cr.

At least one of Mo: 1% or less (excluding 0%), Ni: 1% or less (excluding 0%), Cu: 0.5% or less (excluding 0%), and Cr: 1% or less (excluding 0%).

Molybdenum (Mo), nickel (Ni), copper (Cu), and chromium (Cr) are elements contributing to stabilization of the retained austenite, and these elements work together with C, Si, Mn, and Al in combination to contribute to the stabilization of the austenite. When the contents of Mo, Ni, and Cr exceed 1.0% and the content of Cu exceeds 0.5%, manufacturing costs are excessively increased, and controlling these elements so as not to exceed these amounts in their contents may be preferable.

Also, adding Cu may cause brittleness, and at this time, adding Ni together with Cu may be preferable.

Furthermore, the cold-rolled steel sheet according to the present disclosure may further include at least one of Sb, Ca, Bi, and B.

At least one of Sb: 0.04% or less (excluding 0%), Ca: 0.01% or less (excluding 0%), Bi: 0.1% or less (excluding 0%), and B: 0.01% or less (excluding 0%).

Antimony (Sb) and bismuth (Bi) are elements effective in improving plating surface quality by hindering the movements of surface oxidation elements such as Si and Al through grain boundary segregation. When the content of Sb exceeds 0.04% and the content of Bi exceeds 0.1%, the above-mentioned effect is exacerbated, and thus, adding 0.04% or less of Sb and 0.1% or less of Bi may be preferable.

Calcium (Ca) is an element advantageous to improvements in processability by controlling the form of a sulfide, and when the content of Ca exceeds 0.01%, the above-mentioned effect is exacerbated; thus, adding 0.01 or less of Camay be preferable.

Boron (B) is effective in suppressing the transformation of soft ferrite at high temperatures by improving hardenability by mixing it with Mn and Cr, but when the content of B exceeds 0.01%, an excessive amount of B may be concentrated on the surface of the steel at a time of plating, which causes a deterioration of plating adhesion. Thus, adding 0.01% or less of B may be preferable.

A remaining component according to the present disclosure is iron (Fe). However, since unintended impurities may be inevitably introduced from raw materials or surrounding environments in a typical steel manufacturing process, these impurities may not be excluded. Since these impurities are well-known to those skilled in the art, the entire contents thereof will not be specifically described in the present specification.

The cold-rolled steel sheet according to the present disclosure, satisfying the above-mentioned component composition, may preferably include as microstructures, by area fraction, 5% or less of polygonal ferrite having a minor axis to major axis ratio of 0.4 or greater, 70% or less (excluding 0%) of acicular ferrite having a minor axis to major axis ratio of 0.4 or less, 25% or less (excluding 0%) of acicular retained austenite, and a remainder of martensite.

At this time, the cold-rolled steel sheet may preferably include, by area fraction, 60% or more of the acicular ferrite and the acicular retained austenite by mixture, and may preferably include 40% or less of the martensite. If the sum of the acicular ferrite and the acicular retained austenite is less than 60%, the area fraction of the martensite is relatively and rapidly increased, and thus, the strength of the steel is advantageously secured while a sufficient degree of ductility thereof is not obtained.

The acicular ferrite and the acicular retained austenite are the main microstructures of the present disclosure, and are microstructures advantageous in securing strength and ductility. According to the present disclosure, a portion of the martensite is included, due to a heat treatment in a manufacturing process to be described later, and thus, 95% or less of two phases, the acicular ferrite and the acicular retained austenite, are included by mixture.

In particular, the acicular retained austenite is an essential microstructure in advantageously securing a balance of strength and ductility, and when the area fraction of the acicular retained austenite is too excessive (exceeding 25%), as carbon disperses and diffuses, the retained austenite may not be sufficiently stabilized. Thus, according to the present disclosure, the area fraction of the acicular retained austenite may preferably satisfy 25% or less (excluding 0%).

Also, according to the present disclosure, the acicular ferrite refers to acicular ferrite including a bainite phase formed at a time of the second annealing heat treatment. More particularly, according to the present disclosure, a bainite phase, from which a carbide is not extracted, unlike in common bainite, is formed by Si and Al of the steel components. Substantially, bainite, from which a carbide is not extracted, is hardly differentiated from the acicular ferrite. Here, the acicular ferrite is formed in an initial heat treatment process of the second annealing heat treatment, and the bainite, from which a carbide is not extracted, is formed in a heat treatment process after reheating of the second annealing heat treatment.

Since the polygonal ferrite functions to reduce the yield strength of the steel, the polygonal ferrite may preferably be limited to 5% or less.

The cold-rolled steel sheet satisfying the above-mentioned microstructure, according to the present disclosure, has a tensile strength of 750 MPa or more, and may have excellent ductility as compared to the steel sheet manufactured through the conventional Q&P heat treatment.

Meanwhile, the cold-rolled steel sheet according to the present disclosure is manufactured through a manufacturing process to be described later. At this time, a microstructure after the first annealing operation, that is, a microstructure before the second annealing operation, may preferably be formed of bainite and martensite having an area fraction of 90% or more.

This is to secure excellent strength and ductility of the cold-rolled steel sheet manufactured through the final second annealing operation. If the area fraction of a low-temperature microstructure phase secured after the first annealing operation is less than 90%, the cold-rolled steel sheet formed of the ferrite, the retained austenite, and the low-temperature microstructure phase according to the present disclosure as described above may not be obtained.

According to another aspect of the present disclosure, a hot-dip galvanized steel sheet is formed by hot-dip galvanizing the above-mentioned cold-rolled steel sheet according to the present disclosure, and includes a hot-dip galvanized layer.

Also, the present disclosure provides an alloyed hot-dip galvanized steel sheet, formed by galvannealing the hot-dip galvanized steel sheet, including an alloyed hot-dip galvanized layer.

Hereinafter, a method for manufacturing a cold-rolled steel sheet according to an aspect of the present disclosure will be described in detail.

The cold-rolled steel sheet according to the present disclosure may be manufactured by processes of reheating, hot rolling, coiling, cold rolling, and annealing a steel slab satisfying the component composition proposed in the present disclosure. The conditions of each process will hereinafter be described in detail.

(Reheating Steel Slab)

According to the present disclosure, a process of reheating and homogenizing the steel slab prior to hot rolling thereof may be performed, and may more preferably be conducted within a temperature range of 1,000° C. to 1,300° C.

When the temperature is less than 1,000° C. at the time of reheating, rolling load rapidly increases, while when the temperature exceeds 1,300° C., the number of surface scales is excessive, and energy costs may increase. Thus, according to the present disclosure, the reheating process may preferably be performed at 1,000° C. to 1,300° C.

(Hot Rolling)

The reheated steel slab is hot rolled to be manufactured into a hot-rolled steel sheet. At this time, hot finishing rolling may preferably be performed at 800° C. to 950° C.

When a rolling temperature is less than 800° C. at the time of hot finishing rolling, rolling load is greatly increased, so that the hot finishing rolling becomes difficult, while when the temperature of the hot finishing rolling exceeds 950° C., heat fatigue of a rolling roll is significantly increased, causing a reduction in the lifetime thereof. Thus, according to the present disclosure, the temperature of the hot finishing rolling at the time of hot rolling may preferably be limited to 800° C. to 950° C.

(Coiling)

The manufactured hot-rolled steel sheet as described above is coiled. At this time, a coiling temperature may preferably be 750° C. or less.

When the coiling temperature is too high at the time of coiling, an excessive number of scales may be formed on the surface of the hot-rolled steel sheet, causing surface defects, which then result in a degradation of plating properties. Thus, the coiling process may preferably be performed at 750° C. or less. At this time, the lowest limit of the coiling temperature is not particularly limited, and the coiling process may preferably be performed at an Ms (martensite transformation starting temperature) of up to 750° C., in consideration of the difficulties in subsequent cold rolling which may be due to an excessive increase in the strength of the hot-rolled steel sheet caused by the formation of martensite.

(Cold Rolling)

The coiled hot-rolled steel sheet may preferably be pickled to remove an oxide layer therefrom, and then cold rolled to fix the shape and thickness thereof, thus being manufactured into a cold-rolled steel sheet.

Commonly, cold rolling is performed to secure a thickness desired by a customer. At this time, a reduction ratio is not limited, and the cold rolling may preferably be performed at a cold reduction ratio of 25% or more, in order to suppress the generation of coarse crystal grains of ferrite at a time of recrystallization in a subsequent annealing process.

(Annealing)

The purpose of the present disclosure is to manufacture a cold-rolled steel sheet including acicular ferrite having a short axis to long axis ratio of 0.4 or less and acicular retained austenite as main phases of the final microstructures. In order to obtain such a cold-rolled steel sheet, control of a subsequent annealing process is important. In particular, in order to secure target microstructures through partitioning of elements such as carbon and manganese at the time of annealing, the present disclosure is characterized in that low-temperature microstructures are secured through the first annealing operation without a Q&P continuous annealing process after common cold rolling, and subsequently, a Q&P heat treatment is performed at the time of the second annealing operation, as described below.

First Annealing

First, the first annealing heat treatment of annealing the manufactured cold-rolled steel sheet at a temperature of Ac3 or more and cooling it may preferably be performed (refer to FIG. 1A).

This is to obtain bainite and martensite having an area fraction of 90% or more as main phases of microstructures of the cold-rolled steel sheet that has been subjected to the first annealing heat treatment. When the annealing temperature does not reach Ac3, a large amount of soft polygonal ferrite is formed, which reduces the possibility of obtaining fine final microstructures, due to the formed polygonal ferrite at a time of two-phase region annealing in the subsequent second annealing heat treatment.

Second Annealing

After the completion of the first annealing heat treatment, the second annealing heat treatment (Q&P heat treatment) of heating and maintaining the cold-rolled steel sheet within a temperature range of Ac1 to Ac3 and cooling it may preferably be performed (refer to FIG. 1B).

According to the present disclosure, the purpose of heating the cold-rolled steel sheet within the temperature range of Ac1 to Ac3 is to obtain the retained austenite in the final microstructures at room temperature by securing the stability of the austenite through partitioning of the alloying elements to the austenite at the time of the second annealing heat treatment, and partitioning of the alloying elements, such as carbon and manganese, as well as reverse transformation of the low-temperature microstructure phases (bainite and martensite) formed after the first annealing heat treatment may be induced by heating and maintaining the cold-rolled steel sheet within the temperature range of Ac1 to Ac3. At this time, the partitioning is referred to as first partitioning.

Here, maintaining the first partitioning of the alloying elements is performed such that a sufficient amount of the alloying elements diffuse toward the austenite, but a time required for the maintaining is not particularly limited. When the maintaining time becomes excessive, a degradation of productivity may occur, and the effect of partitioning may be exacerbated; in consideration of this, the maintaining time may preferably be limited to 2 minutes or less.

As described above, it may be preferable that the first partitioning of the alloying elements is completed, the cold-rolled steel sheet is cooled within a temperature range of Ms (a martensite transformation starting temperature) to Mf (a martensite transformation ending temperature), and the cold-rolled steel sheet is reheated at a temperature of Ms or more so as to induce the alloying elements to be partitioned. At this time, the partitioning is referred to as second partitioning.

An average cooling rate may preferably be 20° C./s or more at the time of cooling, which inhibits polygonal ferrite from being formed at the time of cooling.

When the heating temperature exceeds 500° C. at the time of reheating after the cooling and remains for a long period of time, the austenite phase transforms into perlite, and as a result, the desired microstructures may not be secured. Thus, heating the cold-rolled steel sheet to a temperature of 500° C. or less at the time of reheating may be preferable. At the time of galvannealing, the cold-rolled steel sheet is inevitably required to be heated to a temperature greater than 500° C., and galvannealing performed in 1 minute or less does not greatly decrease the desired physical properties.

Meanwhile, a steel sheet may be allowed to pass through a slow cooling section immediately after the annealing thereof, in order to suppress diagonal travel of the steel sheet at a time of cooling after the annealing, but the microstructures and physical properties intended by the present disclosure may be secured by controlling the transformation into polygonal ferrite in such a slow cooling section as carefully as possible.

In the case of applying the annealing process according to the present disclosure, the rate of reverse transformation into austenite is increased in comparison to the case of performing a conventional annealing process, that is, performing a continuous annealing process after cold rolling, and thus, the present disclosure has the advantages of securing strength and ductility due to refinement of the microstructures, as well as reducing the annealing time.

This may be confirmed by FIG. 2. FIG. 2 illustrates a transformation into austenite for the time duration at the annealing temperature at the time of annealing using a time function, and it can be seen that the low-temperature microstructures are secured in the first annealing operation and that the transformation into austenite is completed within a shorter period of time in the case (the green line) of applying an additional annealing process (in the second annealing operation), as in the present disclosure, in comparison to a continuous annealing process (the red line) using a conventional cold-rolled steel sheet.

As such, the present disclosure allows the low-temperature microstructures, formed after the first annealing operation, to be heated and maintained within the temperature range of Ac1 to Ac3, so as to induce the first partitioning of the alloying elements such as carbon and manganese, as well as allowing rapid reverse transformation, and then allows the low-temperature microstructures to be cooled and reheated, so as to induce the second partitioning of the alloying elements, thus securing fine microstructures, in comparison to the microstructures obtained through the conventional Q&P heat treatment, and excellent ductility.

(Plating)

A plated steel sheet may be manufactured by plating the cold-rolled steel sheet that has been subjected to the first and second annealing heat treatments. At this time, the plating may preferably be performed using a hot-dip galvanizing method or an alloying hot-dip galvanizing method, and a plated layer formed thereby may preferably be based on zinc.

In the case of using the hot-dip galvanizing method, the cold-rolled steel sheet is dipped into a galvanizing bath to be manufactured into a hot-dip galvanized steel sheet, and in the case of using the alloying hot-dip galvanizing method, the cold-rolled steel sheet is subjected to a common galvannealing treating in order to be manufactured into a galvannealed steel sheet.

Hereinafter, the present disclosure will be described more specifically, according to examples. However, the following examples should be considered in a descriptive sense only and not for purposes of limitation. The scope of the present invention is defined by the appended claims, and modifications and variations may reasonably be made therefrom.

MODE FOR INVENTION

Examples

A molten metal having the component composition shown in Table 1 below was manufactured into a steel ingot having a thickness of 90 mm and a width of 175 mm through vacuum melting. The steel ingot was reheated at 1,200° C. for 1 hour to be homogenized, and was hot finish rolled at a temperature of Ar3 or more, for example, at 900° C., to be manufactured into a hot-rolled steel sheet. Subsequently, hot coiling was simulated by cooling the hot-rolled steel sheet, inserting the cooled hot-rolled steel sheet into a furnace previously heated to 600° C., maintaining the inserted hot-rolled steel sheet in the furnace for 1 hour, and cooling the hot-rolled steel sheet in the furnace. This hot-rolled steel sheet was cold rolled at a cold reduction ratio of 50% to 60%, and subjected to an annealing heat treatment under the conditions of Table 2 below, to be manufactured into a final cold-rolled steel sheet. Microstructure area fraction, yield strength, tensile strength, and elongation percentage of each cold-rolled steel sheet were measured, and measurement results are shown in Table 2 below.

TABLE 1

| Category | Component Composition (wt %) | | | | | | | | | | | Bs | Ms | Ac1 | Ac3 |
|---|---|---|---|---|---|---|---|---|---|---|---|---|---|---|---|
| | C | Si | Mn | Ni | P | S | Sol. Al | Ti | Nb | B | N | (° C.) | (° C.) | (° C.) | (° C.) |
| Inventive Steel 1 | 0.15 | 1.51 | 2.21 | — | 0.011 | 0.005 | 0.03 | — | — | — | 0.003 | 591 | 408 | 743 | 852 |
| Inventive Steel 2 | 0.18 | 1.45 | 2.22 | — | 0.012 | 0.004 | 0.51 | 0.021 | — | 0.0011 | 0.004 | 582 | 395 | 741 | 1043 |
| Inventive Steel 3 | 0.20 | 1.60 | 2.80 | — | 0.010 | 0.003 | 0.05 | — | — | — | 0.004 | 524 | 369 | 740 | 834 |
| Inventive Steel 4 | 0.24 | 1.53 | 2.11 | 0.5 | 0.013 | 0.005 | 0.03 | — | — | — | 0.004 | 557 | 364 | 736 | 829 |
| Inventive Steel 5 | 0.21 | 1.50 | 2.60 | — | 0.011 | 0.004 | 0.04 | 0.020 | — | — | 0.004 | 539 | 371 | 739 | 838 |
| Inventive Steel 6 | 0.18 | 1.41 | 2.60 | — | 0.012 | 0.004 | 0.49 | 0.019 | 0.024 | — | 0.004 | 547 | 384 | 736 | 1021 |
| Comparative Steel 1 | 0.08 | 1.38 | 1.71 | — | 0.011 | 0.005 | 0.04 | — | — | — | 0.003 | 655 | 453 | 745 | 887 |
| Comparative Steel 2 | 0.18 | 1.51 | 3.41 | — | 0.010 | 0.005 | 0.03 | — | — | — | 0.004 | 475 | 359 | 730 | 808 |
| Comparative Steel 3 | 0.28 | 1.65 | 4.95 | — | 0.011 | 0.003 | 0.04 | — | — | — | 0.004 | 309 | 270 | 718 | 752 |

In Table 1 above, Bs=830−270C−90Mn−37Ni−70Cr−83Mo, Ms=539−423C−30.4Mn−12.1Cr−17.7Ni−7.5Mo, Ac1=723−10.7Mn−16.9Ni+29.1Si+16.9Cr+290As+6.38W, and Ac3=910−203√C−15.2Ni+44.7Si+104V+31.5Mo+13.1W−30Mn−11Cr−20Cu+700P+400Al+120As+400Ti. Here, the chemical elements denote wt % of added elements, Bs denotes a bainite transformation starting temperature, Ms denotes a martensite transformation starting temperature, Ac1 denotes an austenite transformation starting temperature during the time of temperature increase, and Ac3 denotes a single phase austenite heat treatment starting temperature during the time of temperature increase.

TABLE 2

| Steel Type | Category | Microstructure Before Final Annealing | Final Annealing Condition (° C.) | | | | Microstructure Fraction (%) | | | | Physical Properties | | |
|---|---|---|---|---|---|---|---|---|---|---|---|---|---|
| | | | Annealung Temperature | Cooling Temperature | Reheating Temperature | Overaging Temperature | PF | LF | LA | M | Yield Strength (MPa) | Tensile Strength (MPa) | Elongation Percentage (%) |
| Inventive Steel 1 | Inventive Example 1 | M | 790 | 250 | 440 | none | 5 | 66 | 12 | 17 | 576 | 850 | 28.0 |
| | Inventive Example 2 | M | 790 | 350 | 440 | none | 5 | 64 | 11 | 20 | 568 | 872 | 27.5 |
| | Inventive Example 3 | B | 790 | 350 | 440 | none | 5 | 65 | 9 | 21 | 540 | 868 | 24.6 |
| Inventive Steel 2 | Comparative Example 1 | Cold Rolling Micro-structure | 790 | 250 | 440 | none | 60 | 16 | 4 | 20 | 380 | 1060 | 16.5 |
| | Comparative Example 2 | Cold Rolling Micro-structure | 790 | 350 | 440 | none | 61 | 18 | 5 | 16 | 365 | 982 | 17.1 |
| | Inventive Example 4 | M | 790 | 250 | 440 | none | 2 | 66 | 11 | 21 | 505 | 996 | 22.3 |
| | Inventive Example 5 | M | 790 | 350 | 440 | none | 2 | 62 | 10 | 26 | 471 | 1005 | 21.1 |
| | Inventive Example 6 | B | 790 | 350 | 440 | none | 2 | 64 | 8 | 26 | 454 | 1020 | 18.5 |
| Inventive Steel 3 | Comparative Example 3 | Cold Rolling Micro-structure | 790 | 250 | 440 | none | 53 | 9 | 6 | 32 | 419 | 1136 | 15.3 |
| | Inventive Example 7 | M | 790 | 250 | 440 | none | 2 | 50 | 10 | 38 | 510 | 1186 | 18.3 |
| | Inventive Example 8 | M | 790 | 350 | 440 | none | 2 | 51 | 10 | 37 | 502 | 1175 | 18.6 |
| Inventive Steel 4 | Inventive Example 9 | M | 790 | 250 | 440 | none | 1 | 60 | 13 | 26 | 591 | 986 | 26.9 |
| | Inventive Example 10 | M | 790 | 350 | 440 | none | 1 | 55 | 12 | 32 | 550 | 1008 | 25.9 |
| Inventive Steel 5 | Comparative Example 4 | Cold Rolling Micro-structure | 790 | 350 | 440 | none | 50 | 10 | 7 | 33 | 480 | 1286 | 14.6 |
| | Inventive Example 11 | M | 790 | 250 | 440 | none | 2 | 50 | 11 | 37 | 506 | 1226 | 17.2 |
| | Inventive Example 12 | M | 790 | 350 | 440 | none | 2 | 51 | 11 | 36 | 515 | 1247 | 18.1 |

TABLE 2-continued

| Steel Type | Category | Micro-structure Before Final Annealing | Final Annealing Condition (° C.) Annealung Temperature | Cooling Temperature | Reheating Temperature | Overaging Temperature | Micro-structure Fraction (%) PF | LF | LA | M | Physical Properties Yield Strength (MPa) | Tensile Strength (MPa) | Elongation Percentage (%) |
|---|---|---|---|---|---|---|---|---|---|---|---|---|---|
| Inventive Steel 6 | Inventive Example 13 | M | 790 | 250 | 440 | none | 2 | 60 | 8 | 30 | 554 | 1248 | 15.7 |
| | Inventive Example 14 | M | 790 | 350 | 440 | none | 2 | 58 | 7 | 33 | 564 | 1250 | 14.6 |
| | Inventive Example 15 | B | 790 | 350 | 440 | none | 2 | 61 | 5 | 32 | 544 | 1256 | 13.6 |
| Compar-ative Steel 1 | Comparative Example 5 | M | 790 | 350 | 440 | none | 25 | 55 | 13 | 7 | 463 | 644 | 32.7 |
| Compar-ative Steel 2 | Comparative Example 6 | M | 790 | 250 | 440 | none | 2 | 48 | 3 | 47 | 643 | 1440 | 9.7 |
| | Comparative Example 7 | M | 790 | 350 | 440 | none | 2 | 52 | 6 | 40 | 784 | 1530 | 9.9 |
| | Comparative Example 8 | B | 790 | none | none | 440 | 2 | 50 | 5 | 43 | 739 | 1520 | 11.3 |
| Compar-ative Steel 3 | Comparative Example 9 | Cold Rolling Micro-structure | 730 | 150 | 440 | none | 40 | 3 | 5 | 52 | 1150 | 1185 | 12.0 |
| | Comparative Example 10 | M | 730 | 150 | 440 | none | 2 | 40 | 6 | 52 | 1080 | 1201 | 13.1 |

In the microstructures before the final annealing in Table 2 above, 'M' denotes martensite, and 'B' denotes bainite. Also, in the microstructure fraction, 'PF' denotes polygonal ferrite, 'LF' denotes acicular ferrite, 'LA' denotes acicular retained austenite, and 'M' includes tempered martensite generated at the time of Q&P heat treatment and fresh martensite generated during the final cooling. Here, in order to obviously differentiate the tempered martensite from the fresh martensite, a precise observation using a microscope is required, and in this example, this is integrally expressed.

Also, in Table 2 above, in the examples in which the microstructures before the final annealing are 'cold-rolled microstructures', the final annealing (the Q&P heat treatment) is performed after the cold rolling, and in the examples in which the microstructures before the final annealing are 'M' or 'B', the annealing process proposed according to the present disclosure, that is, the first annealing operation (the heat treatment process for securing the low-temperature microstructure), is applied.

Also, in Table 2 above, the cooling temperature denotes a temperature cooled within a temperature range of Ms to Mf at the time of the final annealing (denoting the second annealing operation, according to the present disclosure), and the reheating temperature denotes a temperature raised for the second partitioning. In the example in which the overaging temperature is indicated as 'none', an overaging treatment of a general continuous annealing process is applied.

As shown in Table 2 above, it can be seen that, in comparison to the case of thermally treating the cold-rolled microstructures in the Q&P manner, despite the steel types having the same component system, the elongation percentage was increased in the case of performing the final annealing after transformation into the low-temperature microstructures through the first annealing operation.

As shown in FIGS. 3 and 4, this is caused by securing the acicular ferrite and the acicular retained austenite by the annealing process given in the present disclosure, which extremely suppresses the area fraction of polygonal ferrite formed at the time of a common Q&P heat treatment.

Meanwhile, it can be seen that, even when the annealing process according to the present disclosure was applied, in a case in which an amount of carbon included in the component composition was insufficient (Comparative Steel 1), securing target strength was difficult, and in a case where the content of Mn was excessively high (Comparative Steel 2 and Comparative Steel 3), the ductility level of the three types of Comparative Steel was secured, as the ductility is very decreased due to the transformation of a large amount of martensite formed by a delay of phase transformation caused by an excessive amount of Mn. In particular, in the case of Comparative Steel 3, which includes a high content of Mn and is an austenite region expansion element, since the temperature range of Ac1 and Ac3 at which the ferrite and the austenite coexist is very narrow, it may be difficult to secure annealing processability.

In view of the results above, the cold-rolled steel sheet manufactured according to the present disclosure may secure a tensile strength of 780 MPa or more and an excellent elongation percentage, thus being easily cold-formed to apply to structural members rather than steels manufactured through the conventional Q&P heat treatment process.

The invention claimed is:

1. A high-strength cold-rolled steel sheet having excellent ductility comprises:

by wt %, carbon (C): 0.1% to 0.3%, silicon (Si): 0.1% to 2.0%, aluminum (Al): 0.005% to 1.5%, manganese (Mn): 1.5% to 3.0%, phosphorus (P): 0.04% or less (excluding 0%), sulfur (S): 0.015% or less (excluding 0%), nitrogen (N): 0.02% or less (excluding 0%), and a remainder of iron(Fe) and inevitable impurities, wherein a sum of Si and Al (Si+Al) (wt %) satisfies 1.0% or more, and wherein a microstructure comprises: by area fraction, 5% or less of polygonal ferrite having a minor axis to major axis ratio of 0.4 or greater, 70% or less (excluding 0%) of acicular ferrite having a minor axis to major axis ratio of 0.4 or less, 25% or less (excluding 0%) of acicular retained austenite, and a remainder of martensite, wherein the high-strength cold-rolled steel sheet has a tensile strength of 750 MPa or more.

2. The high-strength cold-rolled steel sheet of claim 1, wherein the martensite is 40% or less (excluding 0%) by area fraction.

3. The high-strength cold-rolled steel sheet of claim 1, further comprising at least one selected from the group consisting of titanium (Ti): 0.005% to 0.1%, niobium (Nb): 0.005% to 0.1%, vanadium (V): 0.005% to 0.1%, zirconium (Zr): 0.005% to 0.1%, and tungsten (W): 0.005% to 0.5%.

4. The high-strength cold-rolled steel sheet of claim 1, further comprising at least one selected from the group consisting of molybdenum (Mo): 1% or less (excluding 0%), nickel (Ni): 1% or less (excluding 0%), copper (Cu): 0.5% or less (excluding 0%), and chromium (Cr): 1% or less (excluding 0%).

5. The high-strength cold-rolled steel sheet of claim 1, further comprising at least one selected from the group consisting of antimony (Sb): 0.04% or less (excluding 0%), calcium (Ca): 0.01% or less (excluding 0%), bismuth (Bi): 0.1% or less (excluding 0%), and boron (B):0.01% or less (excluding 0%).

6. A high-strength hot-dip galvanized steel sheet, hot-dip galvanized on the high-strength cold-rolled steel sheet of claim 1.

7. A method for manufacturing a high-strength cold-rolled steel sheet having excellent ductility and a tensile strength of 750 MPa or more comprising:

reheating a steel slab at 1,000° C. to 1,300° C., wherein the steel slab comprises: by wt %, carbon (C): 0.1% to 0.3%, silicon (Si): 0.1% to 2.0%, aluminum (Al): 0.005% to 1.5%, manganese (Mn): 1.5% to 3.0%, phosphorus (P): 0.04% or less (excluding 0%), sulfur (S): 0.015% or less (excluding 0%), nitrogen (N): 0.02% or less (excluding 0%), and a remainder of iron (Fe) and inevitable impurities, wherein a sum of Si and Al (Si+Al) (wt %)satisfies 1.0% or more;

manufacturing a hot-rolled steel sheet by hot finishing rolling the reheated steel slab at 800° C. to 950° C.;

coiling the hot-rolled steel sheet at 750° C. or less;

manufacturing a cold-rolled steel sheet by cold rolling the coiled hot-rolled steel sheet;

performing a first annealing operation of annealing and cooling the cold-rolled steel sheet at a temperature of Ac3 or more; and performing a second annealing operation of heating and maintaining the cold-rolled steel sheet at a temperature of Ac1 to Ac3 after the first annealing operation, cooling the cold-rolled steel sheet at a temperature of Ms to Mf at a cooling rate of 20 C/s or more, reheating the cold-rolled steel sheet at a temperature of Ms or more, maintaining the cold-rolled steel sheet for 1 second or more, and cooling the cold-rolled steel sheet, wherein a microstructure comprises:

by area fraction, 5% or less of polygonal ferrite having a minor axis to major axis ratio of 0.4 or greater, 70% or less (excluding 0%) of acicular ferrite having a minor axis to major axis ratio of 0.4 or less, 25% or less (excluding 0%) of acicular retained austenite, and a remainder of martensite.

8. The method of claim 7, wherein the cold-rolled steel sheet comprises 90% or more of bainite and/or martensite by area fraction as microstructures before the second annealing operation.

9. The method of claim 7, wherein the steel slab further comprises at least one selected from the group consisting of titanium (Ti): 0.005% to 0.1%, niobium (Nb): 0.005% to 0.1%, vanadium (V): 0.005% to 0.1%, zirconium (Zr): 0.005% to 0.1%, and tungsten (W): 0.005% to 0.5%.

10. The method of claim 7, wherein the steel slab further comprises at least one selected from the group consisting of molybdenum (Mo): 1% or less (excluding 0%), nickel (Ni): 1% or less (excluding 0%), copper (Cu):0.5% or less (excluding 0%), and chromium (Cr): 1% or less (excluding 0%).

11. The method of claim 7, wherein the steel slab further comprises at least one selected from the group consisting of antimony (Sb): 0.04% or less (excluding 0%), calcium (Ca): 0.01% or less (excluding 0%), bismuth(Bi): 0.1% or less (excluding 0%), and boron (B): 0.01% or less (excluding 0%).

* * * * *